April 11, 1967 G. T. LACY ETAL 3,313,170
ELECTROMECHANICAL ACTUATOR
Filed Aug. 10, 1964 2 Sheets-Sheet 1
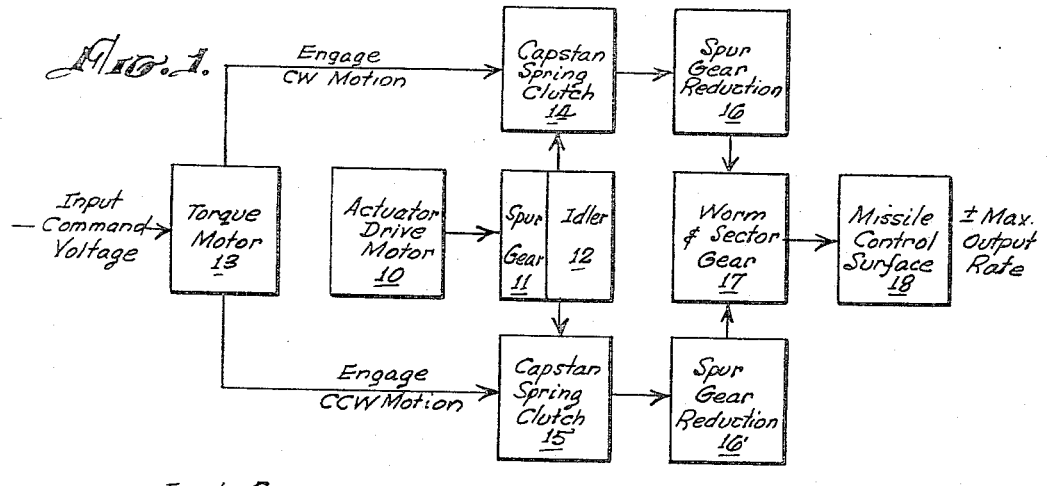
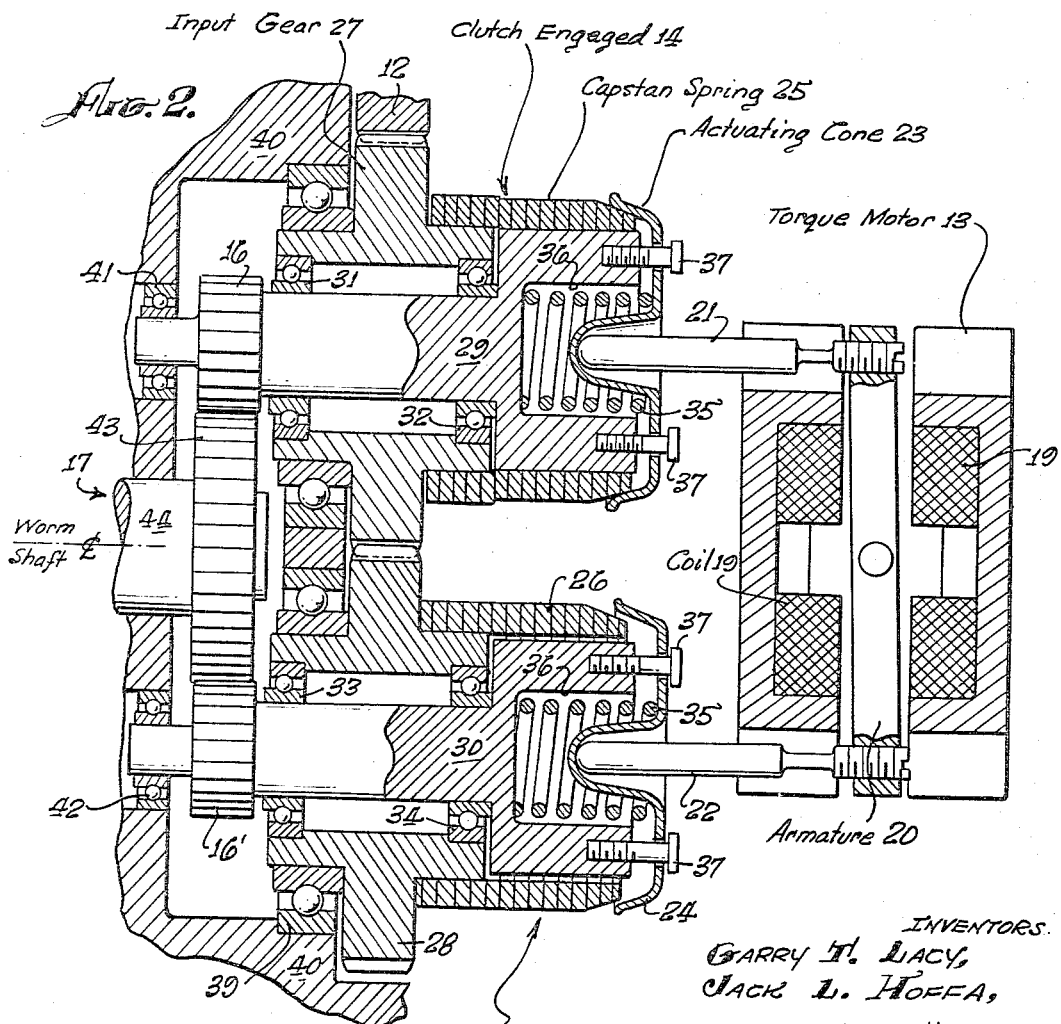
INVENTORS.
GARRY T. LACY,
JACK L. HOFFA,
By John H. Heywood
ATTORNEY.

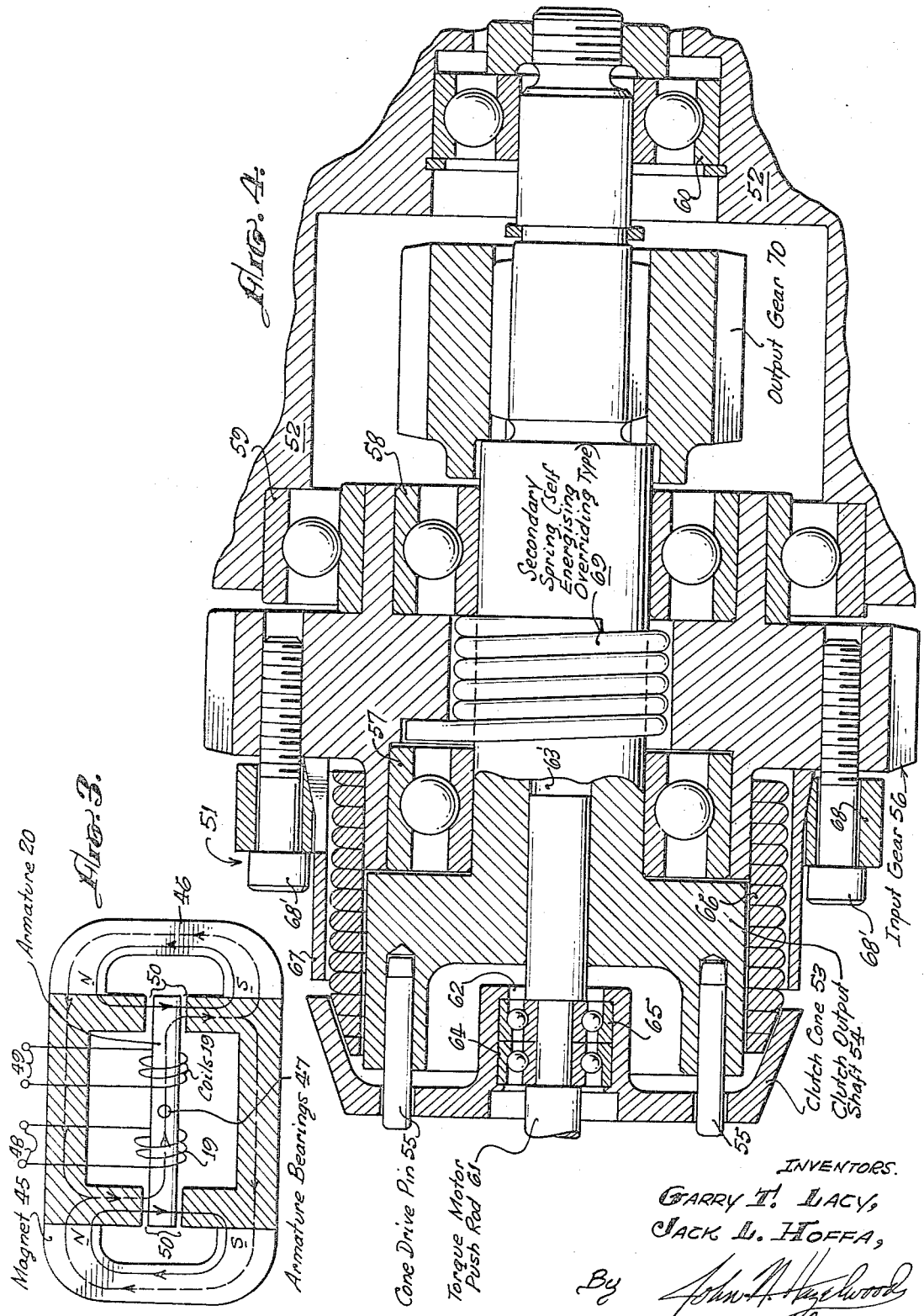

United States Patent Office 3,313,170
Patented Apr. 11, 1967

3,313,170
ELECTROMECHANICAL ACTUATOR
Garry T. Lacy, Claremont, and Jack L. Hoffa, Brea, Calif., assignors to General Dynamics Corporation, Pomona, Calif., a corporation of Delaware
Filed Aug. 10, 1964, Ser. No. 388,525
12 Claims. (Cl. 74—365)

ABSTRACT OF THE DISCLOSURE

This disclosure relates to an electromechanical actuator or transmission system commonly referred to as a reversing gear arrangement whereby torque can be applied to a worm gear output shaft in either direction without reversing or stopping the application of input torque. The structure shown includes an input drive motor driving an input shaft, a pair of clutch input gears, a pear of electrically actuated clutches, a pair of clutch output shafts, a pair of clutch output gears, a worm input gear and a worm gear power take-off. The general arrangement is such that actuation of either of the two clutches determines the direction of power output. The clutches shown are capstan spring clutches and are actuated by means of an electromagnetic torque motor and associated push rods which cause force to be applied to either of the clutch springs through actuating cones when a differential current is applied to the torque motor.

---

This invention relates to electromechanical actuators, and more particularly to electromechanical actuators of the type in which the torque developed by an output shaft is required to be dependent in sense and value on the sense and value of an electrical control signal.

As well known, electromechanical actuators may incorporate spring clutches of the type comprising precision wound and ground springs, which tighten or loosen their grip on cylindrical surfaces in response to forces which tend to wind or unwind them. Inasmuch as spring clutches are fast acting they are particularly suitable for use in devices where an immediate response to a control signal is required. The prior art is exemplified by U.S. Patent No. 2,975,648 to G. H. Doerries.

This invention is directed to an electromechanical actuator utilizing spring clutches in cooperation with a bi-stable rate type servo control system element designed to be compatible with, and driven by, an electronic bi-stable switching amplifier. The output of the actuator is a maximum clockwise (CW) or counter-clockwise (CCW) rate of change of control surface incidence angle when utilized in an air vehicle, for example. With the bi-stable amplifier/actuator combination included in a closed loop system such that a limit cycle state is sustained, then, changes in gain of other elements situated in the forward path of the loop will be automatically compensated for by a resulting inverse change of non-linear gain in the bi-stable amplifier/actuator combination. The application of this principle, for example, to form a guided missile adaptive control system imposes very severe transport time delay requirements upon the actuator design. The unique quality of the actuator of this invention is a reduction of the transport time delay, by the application of a permanent magnet torque motor as a clutch input transducer, to a value less than that available from known actuators. The practical feasibility of an overall adaptive control system can in this way be improved by the realization of an actuator total transport delay time of less than 5 milliseconds.

Therefore, it is an object of this invention to provide an electromechanical actuator.

A further object of the invention is to provide an electromechanical actuator having a very small transport delay time.

Another object of the invention is to provide an actuator utilizing a clutch responsive to control signals for activating or deactivating the same.

Another object of the invention is to provide an actuator having a small transport time delay due to the application of a permanent magnet torque motor as a clutch limit transducer.

Other objects of the invention, not specifically set forth above, will become readily apparent from the following description and accompanying drawings wherein:

FIG. 1 is a block diagram of the components of the actuator of the invention;

FIG. 2 is a view partially in cross section of an embodiment of the invention;

FIG. 3 is a schematic diagram of the torque motor incorporated in the invention; and FIG. 4 is a view partially in cross section of a portion of another embodiment of the invention.

In missiles such as the shipboard fired type which are controlled by four tail control surfaces, each surface is driven by a separate electromechanical actuator of the invention. As pointed out above, each actuator, in combination with a bistable switching amplifier situated in the autopilot electronics operates in a bistable mode such that the output is a maximum CW or CCW rate of change of tail incidence angle. The overall missile control system is adaptive by virture of including in a closed loop the bistable switch/actuator combination in cascade with the missile dynamics such that a limit cycle mode is sustained. Changes in gain in the forward path of the loop, i.e., aerodynamic parameter changes, will then be automatically compensated for by a resulting inverse change of non-linear gain in the bistable switch/actuator combination. The limit cycle characteristics are fully determined only by including missile loop parameters together with the internal dynamics of the actuators themselves. The absence of the more conventional closed loop position feedback directly around the actuator also introduces a need for special consideration of tail position drift errors due to internal unbalance within the actuators and external loading applied to the tails.

Referring now to the drawings, FIG. 1 diagrammatically shows a unidirectional actuator drive motor 10 drivingly connected to a gear chain comprising a spur gear reduction unit which drives an idler unit 12. An input command signal or voltage is fed to a torque motor 13, motor 13 being operatively connected for clockwise motion to a first capstan spring clutch 14 and for counter-clockwise motion to a second capstan spring clutch 15. The idler unit 12 is operatively connected to spring clutches 14 and 15. Spring clutches 14 and 15 are operatively connected to spur gear reduction units 16 and 16', respectively. Each of the reduction units 16 and 16' are drivingly connected to a worm and sector gear unit 17 which drive an output such as a missile control surface 18 in a ± direction at a maximum output rate.

As shown in the FIG. 2 embodiment, the general combination of components are shown in sufficient detail to provide an understanding of the invention. Torque motor 13 is of the permanent magnet type and described in greater detail hereinafter with respect to FIG. 3. Broadly, the torque motor 13 includes coils 19 and an armature 20, said armature 20 being operatively connected to a pair of push rods 21 and 22 which are adjustably positioned against actuating cones 23 and 24, respectively, of capstan spring clutches 14 and 15. Capstan spring clutches 14 and 15 include, in addition to their respective actuating cones 23 and 24, capstan or helically wound springs 25 and 26 being mounted at one end thereof on input gears 27 and 28 which are drivingly connected to idler unit 12. Springs 25 and 26 are positioned around clutch mandrels or members 29 and 30 which are mounted within input gears 27 and 28, respectively, via ball type bearings 31–32 and 33–34, respectively. Each of spring clutches 14 and 15 is provided with a disengaging spring 35 which is mounted in a cavity 36 in the members 29 and 30 and retained via actuating cones 23 and 24 by a plurality of pins 37 which are attached to members 29 and 30 and allow cones 23 and 24 to move thereon. As shown, clutch 14 is engaged while clutch 15 is disengaged. Input gears 27 and 28 are mounted via bearings 38 and 39, respectively, in a housing 40, while the ends of clutch output members 29 and 30 opposite cavities 36 are supported by housing 40 through bearings 41 and 42, respectively. Spur reduction gears 16 and 16' are mounted on clutch mandrels or members 29 and 30, respectively, by a means such as keys or splines (not shown), spur gears 16 and 16' being drivingly connected with a gear 43 of worm and sector gear unit 17. Gear 43 is mounted on an output worm shaft 44 of unit 17 by any conventional means, shaft 44 being connected to the associated unit to be driven thereby such as missile control surface 18 through gearing such as a worm gear, for example.

The torque motor 13 is an electromechanical transducer designed to convert a small differential current into a mechanical force. The field structure of the torque motor consists of two magnets 45 and 46 arranged in opposition as shown in FIG. 3. The armature 20 is a flat bar mounted on two flexure bearings indicated at 47 which provide both pivoting and torsional restraint of the armature 20. Each of the two coils 19 on the armature is wound in opposite directions and connected to an individual pair of control terminals 48 and 49. With no current in the coils 19 and with the armature 20 centered, the polarizing flux supplied by the magnets assumes the path shown by the solid lines in FIG. 3. With differential current applied to the coils 19, a "control flux" is produced in the armature 20 and takes the path shown by the dotted lines in FIG. 3. Part of the polarizing flux then follows the same path and reinforces the control flux. Thus, the flux density increases in two of the four air gaps 50 and decreases in the remaining two, causing a torque unbalance on the armature 20. The torque motor 13 has an extremely high torque to inertia ratio and exhibits a high natural frequency, in the order of several hundred cycles per second.

Operation of the actuator is as follows: The contrarotating clutch input gears 27 and 28 which mount the capstan springs 25 and 26 are driven at an essentially constant speed by the drive motor 10 and reduction gear train through units 11 and 12. This portion of the system runs continuously and provides the necessary energy source to drive the output load. Both clutch output members 29 and 30 are geared through a further spur gear stage 16 and 16' to a single output shaft 44 via gear 43. The actuator output of worm shaft 44 carries a sector gear 17 in mesh with the shaft 44 and provides an effective drive for the areodynamic control surface 18, for example, when the invention is utilized for controlling the control surface. Engagement of either one of the clutches 14 or 15 closes the drive path between the motor 10 and the control surface 18, thus imparting maximum velocity to the surface 18 in a direction depending upon which clutch is engaged. Clutch engagement is achieved by winding of the capstan spring 25 or 26 around the clutch output shaft or member 29 or 30, respectively; while, in the disengaged condition, there is a small clearance between the spring and the shaft (see FIG. 2). Engagement wind-up is triggered by applying an axial force, by means of the push rods 21 or 22 connected to armature 20 of the torque motor 13, to the clutch actuating cones 23 or 24, respectively, which results in an initial closing between the end coils of springs 25 or 26, and the clutch shaft or members 29 or 30. This in turn produces a frictional torque on the springs 25 or 26 which when sufficient to overcome the torsional stiffness thereof, results in a complete wind-up.

Significant factors in minimizing the clutch engagement transport time delay are, minimum disengaged clearance between the spring and mandrel, large disengaged relative velocity between spring and mandrel, actuating cone to rotate with the mandrel, capstan spring to rotate with the input gear, and minimum time response of cone triggering means. Extensive testing shows the cone triggering mechanism to be the major source of delay.

Significant improvement over the prior art actuators is made by the application of the permanent magnet torque motor as an input force transducer, arranged as shown in FIG. 2. Minimizing the cone/capstan spring working clearance to take maximum advantage of the high efficiency available from the torque motor makes it a highly advantageous device requiring only a portion of the power used by transducing methods of other known clutch servo actuators.

FIG. 4 is a modified embodiment of the FIGS. 1–3 actuator and differs essentially in the clutch arrangement. While only one clutch and associated gear mechanism is shown, the FIG. 4 embodiment may be duplicated to operate in the same manner as the FIG. 2 device. The actuator clutch assembly generally indicated at 51 is mounted in a housing 52 by roller type bearings presently described and comprises an actuating clutch cone 53 operatively connected through cone drive pins 55 to an output shaft or mmeber 54 which is mounted within an input gear 56 via bearing 57 and 58, gear 56 being mounted in housing 52 via bearing 59 and 60. A torque motor push rod 61 extends through an aperture 62 in cone 53 and into a cavity 63 in output shaft 54, rod 61 being mounted in bearings 64 and 65 which are supported in cone 53. A capstan spring 66 is mounted at one end on input gear 56 with coils thereof extending around output shaft or member 54. A casing-like member 67 is positioned around capstan spring 66 and attached to input gear 56 via a spring attachment ring 68 by means such as bolts 68'. Positioned around shaft 54 and between bearings 57 and 58 is a secondary spring 69 of the self energizing overriding type which functions to maintain the input gear 56 and the output member 54 of the clutch member at the same speed during clutch engagement due to the capstan (frictional) action of the spring 69. An output gear 70 is mounted on shaft 54 between bearing 58 and 60 for driving an associated output member such as the gear unit 17 and control surface 18 of the FIG. 1 device. If desired, the secondary spring 69 may be omitted in applications where a difference in speed between units 56 and 54 can be tolerated during certain periods of clutch engagement.

Since the operation of the FIG. 4 embodiment is obvious in view of the above description of operation of the FIGS. 1–3 embodiment, description of the operation thereof is deemed unnecessary.

While the magnets have been illustrated as being of the permanent type, other types may be utilized when the invention is adapted to certain types of applications compatible with other types of magnets.

It has thus been shown that this invention provides an actuator which is relatively simple while having high efficiency output.

While particular embodiments of the invention have been illustrated and described, modifications will be apparent to those skilled in the art, and it is intended to cover in the appended claims all such modifications as come within the spirit and scope of the invention.

What we claim is:
1. An actuator comprising: a gear train including an output member, a plurality of clutch means operatively connected with said gear train, input means operatively connected to each of said clutch means, means for driv- ing said input means, and a torque motor means for selectively actuating said plurality of clutch means, whereby clutch engagement transport time delay is reduced to a minimum, each of said clutch means including an output element operatively connected to said gear train, spring means positioned around at least a portion of said output element and operatively connected to said input means, actuating cone means movably mounted with respect to said output element and said spring means, means for restraining movement of said cone means toward said output element, said cone means being constructed so as to abut at least a portion of said spring means when moved by said torque motor means, whereby said spring means is moved into contact with said output element upon movement of said cone means by said torque motor means.

2. The actuator defined in claim 1, wherein said torque motor means includes a movable armature, a plurality of separately energized coils positioned around said armature, and a plurality of drive members connected with said armature and operatively connected with an actuating member of said clutch means.

3. The actuator defined in claim 1, wherein said torque motor means includes a casing, a plurality of magnets operatively connected with said casing, an armature pivotally mounted within said casing, a plurality of separately energized coil means located within said casing and positioned around said armature, and output means operatively connected to said armature.

4. The actuator defined in claim 1, wherein said torque motor means includes magnet means, a movable armature means operatively associated with said magnet means, and means for creating a differential force across said armature means, whereby movement of said armature means, due to the differential force created thereacross, causes the selective actuation of said clutch means.

5. An electromechanical actuator comprising an output shaft; a pair of gears drivingly connected with said output shaft; a pair of capstan spring clutch means each including an output member drivingly connected to one of said gears, a capstan spring having one end thereof positioned around at least one end of said output member and normally spaced a predetermined distance therefrom, actuating cone means adapted to move with respect to said output member and adapted to abut a portion of said capstan spring, and means for restraining said cone means with respect to movement thereof toward said capstan spring; a pair of input gears each operatively connected to the other end of a capstan spring of said capstan spring clutch means, means adapted for continuously driving said input gears, and torque motor means adapted for selectively actuating said capstan spring clutch means.

6. The electromechanical actuator defined in claim 5, wherein said torque motor means includes a movable armature, a plurality of separately energized coil means positioned around said armature, and a plurality of drive members connected with said armature and adapted to move said actuating cone means against the restraining means of said clutch means upon movement of said armature means for actuating said clutch means.

7. The electromechanical actuator defined in claim 5, wherein said torque motor means includes a casing, a plurality of magnets operatively connected with said casing, an armature pivotally mounted within said casing, a plurality of separately energized coil means located within said casing and positioned around said armature, and output means operatively connected to said armature and adapted to move the actuating cone means of said clutch means.

8. The electromechanical actuator defined in claim 5, wherein said torque motor means includes magnet means, a movable armature operatively positioned with respect to said magnet means, and means for creating a differential force across said armature means, whereby movement of said armature means, due to the differential force thereacross, causes the selective actuation of said capstan spring clutch means.

9. An electromechanical actuator comprising an output shaft; a pair of gears drivingly connected with said output shaft; a pair of capstan spring clutches each including an output member drivingly connected to one of said gears, a capstan spring having one end thereof positioned around at least one end of said output member and normally spaced a predetermined distance therefrom, a spring means operatively positioned around a portion of said output member, and actuating cone means adapted to move with respect to said output member and adapted to abut a portion of said capstan spring; a pair of input gears each operatively connected to the other end of a capstan spring of said capstan spring clutches, said spring means of each spring clutch having one end thereof operatively connected to one of said input gears, means adapted for continuously driving said input gears, and torque motor means adapted for selectively actuating said capstan spring clutches.

10. The electromechanical actuator defined in claim 9, wherein said torque motor means includes magnet means, a movable armature means operatively positioned with respect to said magnet means, and means for creating a differential force across said armature means, whereby movement of said armature means due to the differential force thereacross causes the selective actuation of said capstan spring clutches.

11. The electromechanical actuator defined in claim 9, wherein said torque motor means includes a movable armature, a plurality of separately energized coil means positioned around said armature, and a plurality of drive members connected with said armature and adapted to move said actuating cone means of said clutch means upon movement of said armature means for actuating said clutch means.

12. The electromechanical actuator defined in claim 9, wherein said torque motor means includes a casing, a plurality of magnets operatively connected with said casing, an armature pivotally mounted within said casing, a plurality of separately energized coil means located within said casing and positioned around said armature, and output means operatively connected to said armature and adapted to move the actuating cone means of said clutch means.

References Cited by the Examiner

UNITED STATES PATENTS

| 2,872,003 | 2/1959 | Nussbaumer | 74—377 X |
|---|---|---|---|
| 2,923,172 | 2/1960 | Lewis | 74—665 |
| 2,930,945 | 3/1960 | Weathers et al. | 317—197 X |
| 2,946,876 | 7/1960 | Lockwood et al. | 317—197 X |
| 2,975,648 | 3/1961 | Doerries | 74—365 X |
| 3,165,676 | 1/1965 | O'Brien | 317—197 X |
| 3,220,275 | 11/1965 | Hewes et al. | 74—365 X |
| 3,253,195 | 5/1966 | Fischer et al. | 317—197 |

References Cited by the Applicant

UNITED STATES PATENTS

| 1,077,519 | 11/1913 | Galta. |
| 2,366,172 | 1/1945 | Bohn. |
| 2,660,899 | 1/1953 | McCammon. |
| 2,819,624 | 1/1958 | Brown, Jr., et al. |
| 2,881,640 | 4/1959 | Chambers. |
| 2,909,075 | 10/1959 | Brown et al. |
| 2,911,843 | 11/1959 | Mitchell. |
| 2,975,648 | 3/1961 | Doerries. |
| 3,026,739 | 3/1962 | Hungerford et al. |
| 3,030,052 | 4/1962 | Grudin. |

FRED C. MATTERN, Jr., *Primary Examiner.*

DAVID J. WILLIAMOWSKY, *Examiner.*

C. J. HUSAR, *Assistant Examiner.*